United States Patent Office 3,548,004
Patented Dec. 15, 1970

---

3,548,004
ETHERS CONTAINING DIFLUORAMINO GROUPS
Lawrence J. Engel, Dunellen, Michael H. Gianni, Roselle, and Charles Wiener, Linden, N.J., assignors to Esso Research and Engineering Company, a corporation of Delaware
No Drawing. Filed Sept. 26, 1963, Ser. No. 312,255
Int. Cl. C07c 93/02
U.S. Cl. 260—584                             4 Claims This invention relates to the novel energetic oxidizer named 1,3-bis[tris(difluoramino)methoxy]-2,2-dinitropropane, its preparation, its utility as an oxidizer, and its utility as a plasticizer of energetic binders in a solid rocket propellant with the object of developing solid rocket propellants of improved performance.

In evaluating merits of liquid oxidizers, a number of criteria are considered, including energy content, low volatility, thermal stability, density, compatibility with other ingredients, ease of preparation, and recovery as a compound of controlled composition.

The compound named 1,3-bis[tris(difluoramino)methoxy]-2,2-dinitropropane is now shown in accordance with the present invention to be prepared suitably and to be acceptable in its evaluated properties as an energetic oxidizer and plasticizer. This compound has the structure:

$$F_2N-\underset{\underset{NF_2}{|}}{\overset{\overset{NF_2}{|}}{C}}-O-\underset{\underset{H}{|}}{\overset{\overset{H}{|}}{C}}-\underset{\underset{NO_2}{|}}{\overset{\overset{NO_2}{|}}{C}}-\underset{\underset{H}{|}}{\overset{\overset{H}{|}}{C}}-O-\underset{\underset{NF_2}{|}}{\overset{\overset{NF_2}{|}}{C}}-NF_2$$

This compound has more than one $NF_2$ group per carbon atom plus the two $NO_2$ oxidizing groups to contribute toward its high energy value. For the sake of brevity, this compound may be termed symmetrical bis[tris($NF_2$)methoxy]dinitropropane. It is outstanding in its relative high density and low volatility compared to other liquid oxidizers that contain both $NF_2$ and $NO_2$ groups.

Preparation of the symmetrical bis[tris($NF_2$)methoxy] dinitropropane involves the reaction of 2,2-dinitropropane-1,3-diol with perfluoroguanidine preferably in the presence of a solvent, such as acetonitrile, and in the presence of a catalyst such as urea at a reaction temperature in the range of 0° to 150° C., preferably at an ambient temperature in the range of 20° to 30° C. In attempting to carry out the reaction at elevated temperatures, e.g. above 80° C., some difficulties may occur in the reaction and separation of the desired product. Reactions were carried out at ambient temperatures using 3 to 1 mole ratio of the perfluoroguanidine to diol reactant, with an acetonitrile solvent and a trace of sodium cyanide as catalyst; the moderate temperatures and analysis of the product showed that the symmetrical bis[tris($NF_2$)methoxy] dinitropropane was obtained.

The reactants employed are known substances which may be prepared in accordance with the prior art, i.e. the diol and the perfluoroguanidine. The perfluoroguanidine, which is less well known, is synthesized by fluorinating a salt of guanidine, e.g. guanidine carbonate dissolved in distilled water at an adjusted pH, preferably 5 to 6, by addition of aqueous HF in accordance with the following equation:

$$\underset{\underset{NH_2}{|}}{\overset{\overset{NH_2}{|}}{C}}NH \cdot H_2CO_3 + F_2 \longrightarrow \underset{\underset{NF_2}{|}}{\overset{\overset{NF_2}{|}}{C}}=NF$$

A specific example on a preferred method of forming the oxidizer with a description of the properties of the product and its relative merits are given as follows.

EXAMPLE

The reaction is represented by the following equation:

$$HOCH_2\underset{\underset{NO_2}{|}}{\overset{\overset{NO_2}{|}}{C}}CH_2OH + 2\ \underset{\underset{NF_2}{|}}{\overset{\overset{NF_2}{|}}{C}}=NF \longrightarrow$$

$$HFN-\underset{\underset{NF_2}{|}}{\overset{\overset{NF_2}{|}}{C}}-OCH_2\underset{\underset{NO_2}{|}}{\overset{\overset{NO_2}{|}}{C}}CH_2O\underset{\underset{NF_2}{|}}{\overset{\overset{NF_2}{|}}{C}}-NFH \xrightarrow{F_2}$$

$$NF_2\underset{\underset{NF_2}{|}}{\overset{\overset{NF_2}{|}}{C}}-OCH_2\underset{\underset{NO_2}{|}}{\overset{\overset{NO_2}{|}}{C}}CH_2O\underset{\underset{NF_2}{|}}{\overset{\overset{NF_2}{|}}{C}}-NF_2$$

A reaction vessel containing 15 mg. of urea and 5 cc. of acetonitrile was charged with 1.4 g. of 2,2-dinitropropane-1,3-diol and then with 5 g. of perfluoroguanidine. The mixture was allowed to react at 23° C. with stirring for 18 hours. At the end of this period excess perfluoroguanidine was removed and the mixture was cooled to 0° C. Fluorine gas and helium were then passed over the product mixture, freed of perfluoroguanidine, for one hour. The product mixture was then placed in a 2-bulb distillation apparatus and the distillate product was collected. The distillation bulb was cooled to about 0° C. and the collection bulb was cooled to —78° C. The solvent was then distilled from the residual product under vacuum.

The residual product was placed on a silica gel chromatographic column and eluted with a 50/50 (v./v.) chloroform-hexane mixture. A pure product in solvent was collected and obtained purified (freed of other components) by removal of solvent under vacuum. The purification is important in obtaining a product which can be identified and which has the desired characteristics.

*Analysis of product.*—Calculated (percent): C, 12.0; F, 45.6. Found (percent): C, 11.7; F, 45.3. Composition: $(O_2N)_2C[CH_2OC(NF_2)_3]_2$.

The N.M.R. analysis is consistent with the structure given for the 1,3-bis[tris(difluoramino)methoxy]-2,2-dinitropropane.

Physical characteristics

Melting point: —20° to 0° C.
Density: 1.63 at (25° C.)
Vapor pressure: 0.07 mm./25° C.; Est. B.P., ° C., 235
Thermal stability: 6 days at 60° C. in duplicate tests gave 7.5 and 5.7 cc. gas/g., respectively
DTA: Slow decomposition starting at 165° C. with explosion at 212° C.
Solubility: Soluble in chloroform, hexane, and acetonitrile
Shock sensitivity: Ca. 2 kg. inches The DTA exotherm is the temperature to which the substance can be heated without radical decomposition or explosion.

Plasticization studies showed that the symmetrical bis[tris($NF_2$)methoxy]dinitropropane is acceptably compatible with the presently available most energetic $CNF_2$ polymers, such as poly[tetrakis($NF_2$)amyl acrylate] having the formula $[C_8H_{10}O_2(NF_2)_4]_n$; abbreviated PTAA.

In these studies it was found that the symmetrical bis[tris($NF_2$)methoxy]dinitropropane acts as a good solvent for such $CNF_2$ polymers at temperatures of 65° C. to be incorporated in the polymer in amounts of 38 to 48 wt. percent with only slight loss by syneresis under ordinary conditions in a long time of standing. To evaluate the merits of the symmetrical bis[tris($NF_2$) methoxy] dinitropropane as a liquid oxidizer and as a plasticizer, comparisons have been made with the liquid oxidizer, hexakis($NF_2$) dipropylether which has the formula: $O(CHNF_2CHNF_2CH_2NF_2)_2$.

The symmetrical bis[tris($NF_2$)methoxy]dinitropropane has a clear advantage over the hexakis($NF_2$)dipropylether in its lower volatility while it has approximately the same density and it is capable of giving a higher impulse when compared in the same kinds of formulations which utilize 35 wt. percent of the plasticizer and 35 wt. percent of PTAA polymer as binder, 5 wt. percent powdered boron and 25 wt. percent nitronium perchlorate (having a 5% inert coating) or when the oxygen oxidizer is hydrazinium diperchlorate. The Isp values obtained in such comparisons with the symmetrical bis[tris($NF_2$)methoxy]dinitropropane used as plasticizer are 292.6 when nitronium perchlorate is used as an inorganic oxygen source and 284 when hydrazinium diperchloraate is used as solid inorganic oxygen source. In formulations containing the hexakis($NF_2$)dipropylether as the plasticizer with the same $CNF_2$ polymer and the mentioned solid inorganic oxygen source, the specific impulse values are 291.5 and 282. Similar high values are obtained when the boron powder is replaced by other metals such as lithium powder which even increases the Isp values in the same kind of formulations to 298 with the symmetrical bis[tris($NF_2$)methoxy]dinitropropane oxidizer and plasticizer.

In the preparation of the symmetrical bis[tris($NF_2$)methoxy]dinitropropane there are three principal steps which have to be properly controlled, namely: (1) the adduction reaction of the 2,2-dinitropropane-1,3-diol with the perfluoroguanidine, (2) the formation of the resulting adduct, and (3) the separation or purification of the fluorinated adduct.

The invention described is claimed as follows:

1. The compound 1,3-bis[tris(difluoramino)methoxy]-2,2-dinitropropane having the composition:

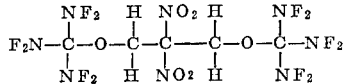

2. The purified compound symmetrical bis[tris($NF_2$)methoxy]dinitropropane having the composition $$(O_2N)_2C[CH_2OC(NF_2)_3]_2$$

having a melting point in the range of —2.0° to 0° C.

3. The method of preparing 1,3-bis[tris(difluoramino)methoxy]-2,2-dinitropropane which comprises reacting 2,2-dinitropropane-1,3-diol with perfluoroguanidine at a temperature in the range of 0° to 150° C. to form a resulting adduct thereof, separating excess perfluoroguanidine from said adduct, then fluorinating said adduct with fluorine and recovering resulting 1,3-bis[tris(difluoramino)methoxy]-2,2-dinitropropane.

4. The method set forth in claim 3 in which the diol is reacted with the perfluoroguanidine in acetonitrile as solvent in the presence of urea to form the adduct which is fluorinated with fluorine, the fluorinated adduct is distilled and freed of the acetonitrile solvent and subsequently the adduct is separated from the impurities by elution with a chloroform-hexane liquid solvent in a silica gel column and then separated from said liquid solvent.

References Cited

Hoffman et al., Chem. Reviews, vol. 62, pp. 12 to 18 (1962).

LELAND A. SEBASTIAN, Primary Examiner

U.S. Cl. X.R.

149—19, 88; 260—564